(12) United States Patent
Staal et al.

(10) Patent No.: US 11,020,897 B2
(45) Date of Patent: Jun. 1, 2021

(54) ADDITIVE MANUFACTURING YIELD IMPROVEMENT

(71) Applicant: AddiFab ApS, Jyllinge (DK)

(72) Inventors: Lasse Guldborg Staal, Jyllinge (DK); Jon Jessen, Veksø (DK)

(73) Assignee: AddiFab ApS, Jyllinge (DK)

( * ) Notice: Subject to any disclaimer, the term of this patent is extended or adjusted under 35 U.S.C. 154(b) by 216 days.

(21) Appl. No.: 15/572,112

(22) PCT Filed: May 6, 2016

(86) PCT No.: PCT/EP2016/060223
§ 371 (c)(1),
(2) Date: Nov. 6, 2017

(87) PCT Pub. No.: WO2016/177893
PCT Pub. Date: Nov. 10, 2016

(65) Prior Publication Data
US 2018/0141241 A1    May 24, 2018

(30) Foreign Application Priority Data

May 7, 2015  (DK) .............................. PA201570271

(51) Int. Cl.
*B29C 64/124*       (2017.01)
*B33Y 10/00*       (2015.01)
(Continued)

(52) U.S. Cl.
CPC ............ *B29C 64/124* (2017.08); *B29C 33/44* (2013.01); *B29C 64/245* (2017.08);
(Continued)

(58) Field of Classification Search
CPC ...... B29C 33/44; B29C 64/245; B29C 64/218
See application file for complete search history.

(56) References Cited

U.S. PATENT DOCUMENTS 9,895,843 B2 *  2/2018  Lobovsky .............. B33Y 10/00
10,086,535 B2 * 10/2018  Joyce ...................... B29C 33/68
(Continued)

FOREIGN PATENT DOCUMENTS

| EP | 1253002 A1 | 10/2002 |
|----|---|---|
| WO | WO 2013/026087 | 2/2013 |
| WO | WO 2014/201486 | 12/2014 |

OTHER PUBLICATIONS

International Search Report in corresponding International Patent Application No. PCT/EP2016/060223, dated Aug. 3, 2016 (4 pages).
Written Opinion in corresponding International Patent Application No. PCT/EP2016/060223, dated Aug. 3, 2016 (5 pages).
Danish Patent and Trademark Office, Search Report in Danish Patent Application No. PA 2015 70271, dated Nov. 20, 2015 (4 pages).

*Primary Examiner* — Jacob T Minskey
*Assistant Examiner* — Virak Nguon
(74) *Attorney, Agent, or Firm* — Nixon Peabody LLP

(57) ABSTRACT

An additive manufacturing apparatus having a container for holding a radiation-curable liquid, and a build platform having a build surface for holding a product being manufactured during a manufacturing process. The build platform is movable relative to the container in a predetermined direction. The apparatus also includes a radiation source for providing hardening radiation to selectively solidify radiation-curable liquid in the container by exposure to form the product. The container includes an interior floor having a flexible floor part maintainable in a planar configuration in which the flexible floor part is planar. A radiation-curable liquid in contact with the interior floor is confined by a container wall having a flexible wall section arranged to move intactly with the flexible floor part. The apparatus includes a deformation system configured to cause a displacement of at least a part of the flexible floor part in a direction having a component normal to and pointing away from the build surface of the build platform.

17 Claims, 6 Drawing Sheets

(51) Int. Cl.
*B33Y 30/00* (2015.01)
*B29C 64/255* (2017.01)
*B29C 64/268* (2017.01)
*B29C 64/245* (2017.01)
*B29C 33/44* (2006.01)
*B33Y 40/00* (2020.01)
*G06T 7/73* (2017.01)
*B29C 64/393* (2017.01)
*H04N 1/00* (2006.01)

(52) U.S. Cl.
CPC .......... *B29C 64/255* (2017.08); *B29C 64/268* (2017.08); *B29C 64/393* (2017.08); *B33Y 10/00* (2014.12); *B33Y 30/00* (2014.12); *G06T 7/74* (2017.01); *H04N 1/00005* (2013.01); *H04N 1/00034* (2013.01); *H04N 1/00039* (2013.01); *B33Y 40/00* (2014.12)

(56) References Cited

U.S. PATENT DOCUMENTS

| | | | |
|---|---|---|---|
| 10,195,840 B2* | 2/2019 | Han | B33Y 30/00 |
| 2011/0089610 A1* | 4/2011 | El-Siblani | B29C 33/44 |
| | | | 264/401 |
| 2013/0270746 A1* | 10/2013 | Elsey | B29C 35/0805 |
| | | | 264/447 |
| 2013/0292862 A1 | 11/2013 | Joyce | |
| 2015/0064298 A1 | 3/2015 | Syao | |
| 2016/0136902 A1* | 5/2016 | Stadlmann | B29C 64/135 |
| | | | 425/174.4 |

* cited by examiner

ADDITIVE MANUFACTURING YIELD IMPROVEMENT

CROSS-REFERENCE TO RELATED APPLICATIONS

This application is a U.S. National Stage of International Application No. PCT/EP2016/060223, filed May 6, 2016, which claims the benefit of Denmark Patent Application No. PA201570271, filed May 7, 2015, both of which are incorporated herein by reference in their entireties.

TECHNICAL FIELD

The present invention relates to additive manufacturing.

BACKGROUND OF THE INVENTION

Additive manufacturing—also called 3D printing—has become an important product development tool. Rapid prototyping, iterative design and concept validation are three disciplines that are considerably facilitated by 3D printers. Several different 3D printing platforms are commercially available in the market today, and each of these platforms have important characteristics and advantages that a product developer may exploit to create design models, demonstrators, functional prototypes and small batches of components for product validation. However, currently available 3D printers share an important set of limitations that are preventing use of 3D printing technologies in mass manufacturing of components.

In mass manufacturing, a high yield is an important way to reduce manufacturing costs. For the purpose of mass manufacturing, control of the manufacturing process is important. Lack of control increases the risk that products are produced that are different from the intended result.

For additive manufacturing apparatuses employing photo-curable resins or other suitable radiation-curable liquids in a bottom-projection set-up (as well as other additive manufacturing apparatuses that rely on the release of a layer from a surface of a build container), lack of control may for instance be caused by the mechanism that provides release of additively manufactured products from a surface of a build container. Such lack of control may manifest in one or more of the following manners:
   a. Poor control of the thickness of each individual layer to be formed, leading to poor control in the z-axis dimension of the products to be manufactured.
   b. Poor control of the magnitude and/or speed and/or direction of the force that is applied to the individual product and/or each individual layer of the product to ensure its release from the surface of the build container.

Improved 3D printing equipment and methods that provide better control of the release of additively manufactured products from a surface of a build container compared to present equipment and methods are desirable.

When using bottom-projection 3D printers that employ solidifying radiation to solidify a reactive liquid that is housed in a liquid container, the most recently solidified layer is essentially glued to the container floor. Detaching this layer from the container floor can cause the product to become deformed, negatively impacting yield.

Patent specification WO 2014/201486 discloses a system for layered construction, the system comprising a container made of an elastic material for containing a light-curable substance and a clamping device, which is designed to exert tension or pressure to the sides of the elastic container in order to stretch or compress, respectively, a bottom of the container to facilitate detachment of the most recently solidified layer from the bottom of the container.

However, the deformation of the bottom of the container that results from applying tension or pressure to the container sides—and the resulting direction and magnitude of detachment force—is not easily controlled and reproduced as essentially the entire bottom is affected to either stretch during tensing or buckle during compression. Especially the buckling, where the bottom—or part of the bottom—of the container moves upwards and/or downwards in response to compression, is hard to control and reproduce for purposes of controlled detachment.

In particular, this way of facilitating detachment is not particularly useful for reproducibly detaching layers of separate products on the bottom when multiple products, that may even have individual sizes, shapes, and/or heights, are being manufactured at the same time. In those instances, detachment of each component happens at the random location where tension and/or buckling forces will first exceed the negative pressure and/or adhesive forces that bind the individual product to the container floor.

An additional drawback is that the elastic nature of either the entire—or part of—the container bottom makes it difficult to ensure a uniform thickness of a reactive liquid that is compressed between the bottom of the container and a build platform that is configured to hold the product(s) to be manufactured during and after the manufacturing process. Such compression to uniform thickness is of importance as it determines the manufacturing precision in a dimension (z) that is perpendicular to the surface of the build platform, and requires that the bottom of the platform can establish and maintain a planar configuration at a fixed distance from the build platform. If the bottom of the container is too elastic and/or flexible, it cannot establish and maintain the planar configuration.

SUMMARY OF THE INVENTION

As disclosed above, uncontrolled release of adherence of solidified layers to the bottom of the container can cause the product to be pulled and/or bent out of the intended shape in an uncontrolled manner, which may negatively affect yield.

A first aspect of the invention mitigates this problem. The first aspect provides an additive manufacturing apparatus comprising:
   a container for holding a radiation-curable liquid (e.g. photo-curable liquid),
   a build platform having a build surface for holding a product being manufactured during a manufacturing process, the build platform being movable relative to the container in a predetermined direction, and
   a radiation source for providing hardening radiation to selectively solidify radiation-curable liquid in the container by exposure to form the product,
and the apparatus is characterized in that:
   the container comprises an interior floor having a flexible floor part maintainable in a planar configuration in which the flexible floor part is planar;
   radiation-curable liquid in contact with the interior floor is confined by a container wall comprising at least one flexible wall section arranged to move intactly with the flexible floor part; and
   the manufacturing apparatus comprises a deformation system configured to cause a displacement of at least a part of the flexible floor part in a direction having a component normal to and pointing away from the build surface of the build platform.

The displacement thereby releasing at least a part of the product from the displaced part of the flexible floor part.

The term "flexible" throughout the description and accompanying claims to be understood as "flexible and/or deformable".

In some embodiments, the deformation system is configured to cause a gradual displacement of at least a part of the flexible floor part.

In some embodiments, the gradual displacement consists of creating a bend with a given shape and depth that spans a width of the flexible floor part and is made to travel along the length of said floor at a given speed by the deformation system.

In some embodiments, the deformation system is configured to cause a gradual increasing displacement of at least a part of the flexible floor part.

In some embodiments, the deformation system is configured to cause a gradual displacement consisting of a bend that spans a width of the flexible floor part and is made to travel along the length of said floor by the deformation system.

In some embodiments, the deformation system is configured to maintain and gradually increase the displacement of at least a part of the flexible floor part at least until release of the product.

Some embodiments further comprise as part of the deformation system one or more flexible exterior parts positioned on an outside of the container, and these configured to receive a predetermined bending force, e.g. a variable bending force, and to communicate at least a part of the predetermined bending force to the flexible floor part to effect the displacement. In some embodiments, the exterior part or parts are an extension of the container floor beyond at least a part of the container wall. In some embodiments, the interior floor and the exterior part are formed integrally.

In some embodiments, the deformation system is configured to cause said displacing by applying a bending force on the exterior part or parts.

In some embodiments, the deformation system comprises one or more movable rollers arranged to engage the exterior part to produce said bending force.

In some embodiments, the deformation system comprises a movable element having a curved groove configured to engage an edge of the exterior part and to move along at least a part of said edge.

In some embodiments, the flexible floor part is supported by an elastic element arranged to maintain the flexible floor part in the planar configuration during a period of time.

In some embodiments, the planar configuration of the flexible floor part is substantially parallel to the build surface.

In some embodiments, the build plane (equally referred to as build surface throughout the description) and flexible floor are configured to compress the radiation-curable (e.g. photo-curable) liquid to a desired layer thickness. As such compression may cause the flexible floor to deform and temporarily lose its planar configuration and/or parallel orientation to the build surface, some further embodiments comprise a flexible floor that is configured to rapidly re-establish a planar configuration and parallel orientation to the build plane surface.

In some embodiments, the deformation system comprises a reconfigurable element configurable to apply a predetermined force, e.g. a variable force, on the exterior part to produce the bend during a bending period. In some embodiments, the predetermined force produces a bend in the flexible floor part, and that bend is caused to travel across the flexible floor part during the bending period. In some embodiments, a shape of the bend is maintained during the travel. In some embodiments, the shape of the bend changes during the travel or part of the travel.

Generally, the principles described above are advantageously implemented by a symmetric deformation system, where the principles described above are applied on two opposite sides of the container, if such two opposite sides are present. This can achieve a symmetric force application and a bending that is substantially equal across the floor, allowing even more control over the release of the product.

At least part of the flexible floor part is at least partly transparent to the hardening radiation.

In some embodiments, a volume of radiation-curable liquid is housed in a container. A layer of said a radiation-curable liquid is trapped between the flexible floor of the container and a build plane surface as said build plane surface is moved to a first lowered position, and compressed to a uniform thickness as the flexible floor is first deformed by the pressure that is translated from the build plane surface through the trapped liquid, and subsequently re-establishes a planar configuration that is parallel to the build plane surface and forces away excess liquid.

Selective exposure of the layer to a hardening radiation, cures sections of liquid with geometries corresponding to one or more products, and the deformation system is activated to effect a detachment of the newly formed layer from the flexible floor of the container. The deformation system imposes a bend on the flexible floor that is given its shape and depth/curvature by bending elements that are part of the deformation system and are moved across the container floor (or a part of the container floor) by the deformation system from one end to the other to release the newly formed layer.

Release happens as the bend reaches the first outer contour of a given product, and comprises a localized, controlled peeling away of the flexible floor from the product in a uniform and highly reproducible manner. The force and direction of this peeling-away is defined by the shape and depth/curvature of the bend as well as the speed of motion of the bend, and may be reduced by e.g. lowering the travel speed of the bend if such reduction is required to avoid excessive deformation. Thus, tailoring of the detachment process to the specifications of the radiation-curable liquid/photo-curable liquid and/or the geometries of the products to be produced is enabled. Since shape, depth, and speed of motion of the bend may be controlled by design (as opposed to the more or less random buckling/pulling that results from the tension or compression of a flexible bottom), the peeling-away imposed by the bend is entirely consistent, and happens in a uniform and reproducible manner independent of the shape, size and number of products disposed across the flexible floor.

In an alternative embodiment, the bend may be moved back and forth locally e.g. to carefully and gradually release a product.

Release of products by controlled peeling-away, as disclosed above, is beneficial compared to random, tension- or compression-induced 'displacement' of the position and/or state of more or less the entire floor, which is quite unpredictable as it depends (among other things) on the size, shape and elasticity of the floor, as well as the size, shape and distribution of products across the floor. More specifically, the gradual peeling-away enables a highly controllable and reproducible release of the product as the floor is moved away from the individual component in a uniform, controlled direction and with a uniform controlled force. A gradual (and controllable) release is particularly an advantage when a plurality of separate products is to be separated from a single container floor.

In conclusion, with aspects and embodiments of the present invention, the product or products is/are subjected to a, gradual, localised, highly controllable, and reproducible force that acts in a highly controllable direction and thereby produces a gradual, localised, highly controllable, and reproducible release of the product(s) from the container floor. The result is an increase in yield through a controlled, uniform, and reproducible detachment of products in a process that may be tailored to the specifications of the radiation-curable liquid/photo-curable liquid and/or geometries of the products to be produced.

BRIEF DESCRIPTIONS OF THE DRAWINGS

Figure 6:
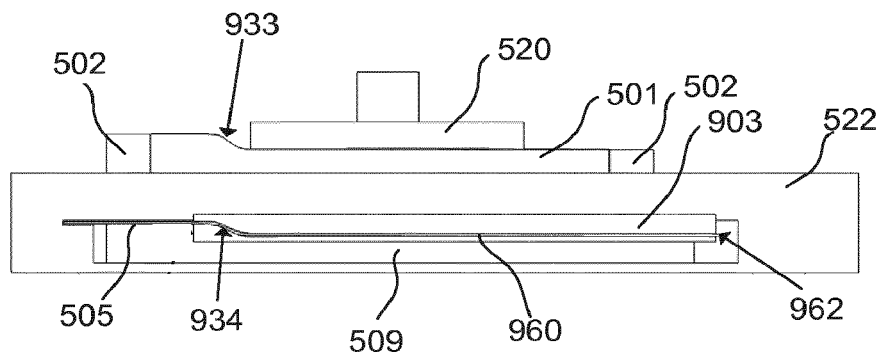
Figure 7:
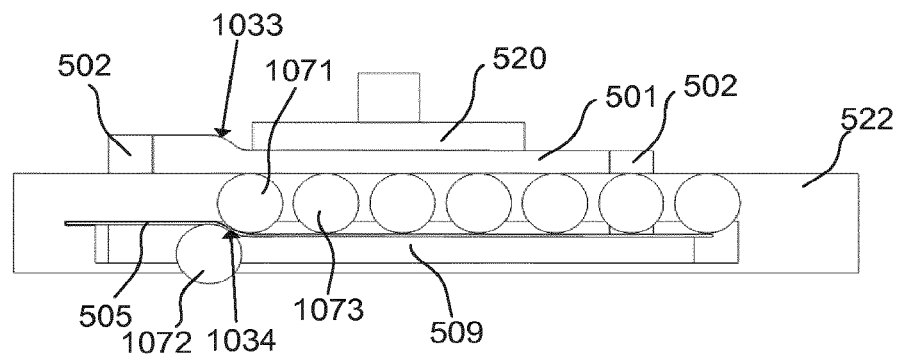
Figure 8:
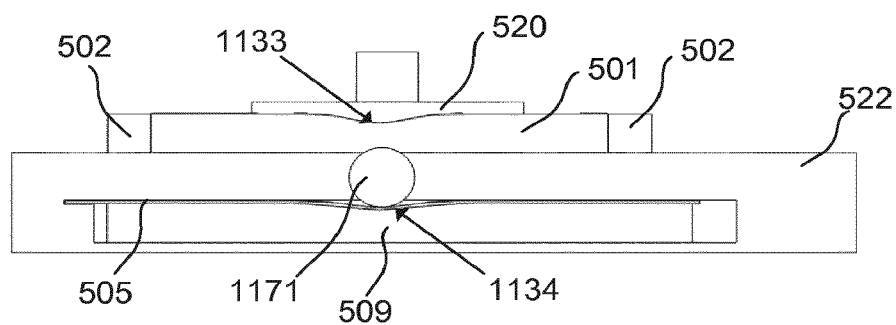

FIG. 6 illustrates an alternative displacement system.
FIG. 7 illustrates an alternative displacement system.
FIG. 8 illustrates an alternative displacement system.

DETAILED DESCRIPTION OF SELECTED EMBODIMENTS

Figure 1:
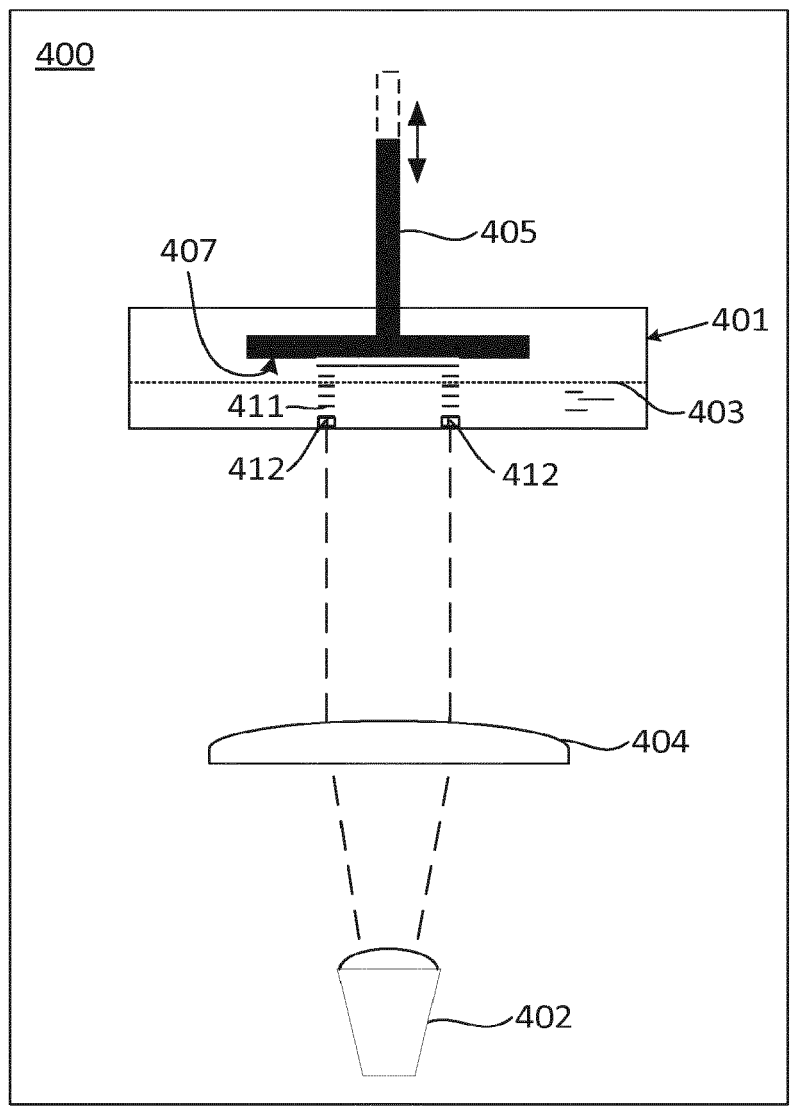
FIG. 1 illustrates schematically a prior-art bottom projection additive manufacturing apparatus.

FIG. 1 illustrates an exemplary 3D printer based on bottom projection. It comprises a container 401 with radiation-curable liquid 403, a build platform 405 having a build surface 407 on which a product will be formed during an additive manufacturing process. An already manufactured part 411 is shown attached to the build surface. Layers are formed by exposing radiation-curable liquid immediately adjacent to the already manufactured part to hardening radiation from a radiation source 402, for instance a Digital Light Processing (DLP) projector. A lens system 404 may be involved to focus the light from the radiation source onto the radiation-curable liquid. A new layer 412 is formed when radiation-curable liquid on the floor of the container is exposed to the hardening radiation. The pattern of the new layer might be defined by a product definition file, while the thickness of the new layer is determined by a distance between the floor and the build platform (which may also be controlled by the product definition file).

To ensure precise control of the thickness of each layer preferably across the entire width and length of the build platform, it is significant that the flexible floor maintains an essentially planar configuration while the liquid on the floor of the container is exposed to the hardening radiation. It is therefore significant that the flexible floor can retain, or rapidly return to, an essentially planar configuration after a deformation. Such a deformation may for instance be caused by the lowering of the build platform to a desired distance over the flexible floor, and the resulting compression of radiation-curable liquid that is trapped between the platform and the floor. A rapid return to the essentially planar configuration is significant to ensure highest possible speed of operation, and requires that excess liquid can be quickly forced away from entrapment between the build platform and the floor by the returning of the floor to its essentially planar configuration.

For these and other reasons, it is important that the flexible floor is made of a material with a stiffness and/or thickness that is sufficient to force away excess liquid as the floor returns to a planar configuration after a deformation. As the magnitude of deformation increases with the width of the floor, the stiffness and/or thickness of the floor must be correlated to the width of the floor. In a preferred embodiment, Gorilla glass or a similar transparent sheet material, with a width of at least 80 mm, preferably at least 100 mm; a thicknesses of at least 0.5 mm, preferably at least 0.7 mm, and with modulus of elasticity of at least 7 GPa, preferably at least 70 GPa, is used.

In one embodiment, a controller controls the motion of the build platform, the intensity of the hardening radiation, and the image provided by the projector.

When the new layer 412 is formed, it is essentially glued to the floor of the vat. To form a new layer, the newly formed layer must be released from the floor, and the build platform 405 be raised some distance. When raising the build platform, a negative pressure forms between the newly formed layer and the floor of the container, producing a vacuum. The release of the negative pressure to allow elevation of the build platform in preparation of a new layer requires the use of forces that are transferred from the build plane surface through the manufactured part(s) to the interface of the parts and the flexible floor. Manufactured parts at this point in the manufacturing process are typically quite pliable, and the vacuum may therefore quite readily pull the manufactured part out of the intended shape.

Embodiments of the present invention mitigate this problem.

Figure 2A:
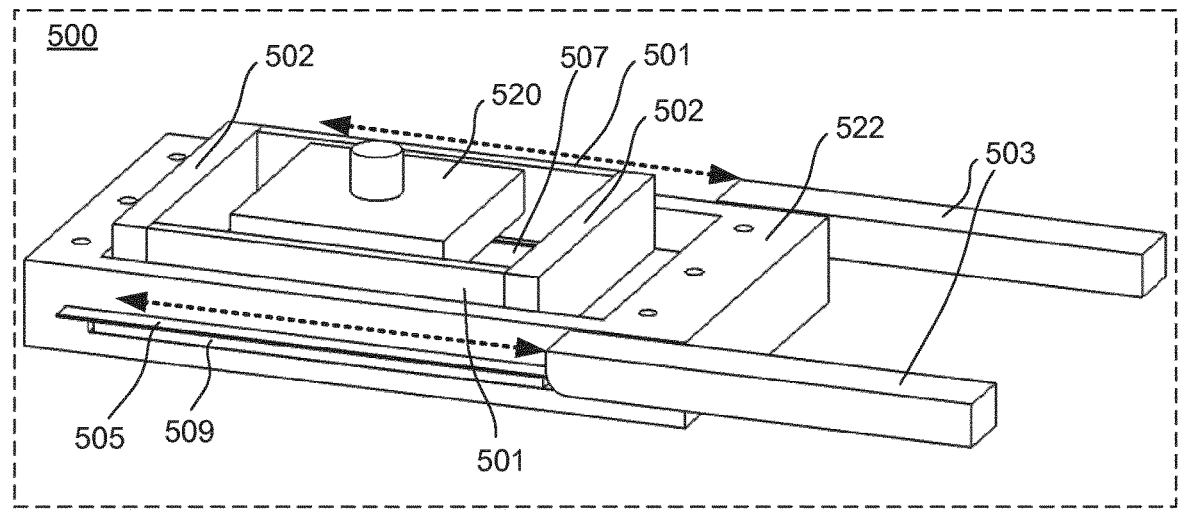
FIGS. 2a and 2b illustrate a container part of an additive manufacturing apparatus in accordance with an embodiment of the invention, wherein the floor of the container is in a planar configuration.

FIG. 2a illustrates a part 500 of an additive manufacturing apparatus in accordance with an embodiment of the present invention. It comprises an at least partly flexible container ("vat") that has a floor 507 and, in this embodiment, four wall parts 501 and 502 forming a rectangle. The wall parts define an interior floor which supports the radiation-curable liquid.

The walls may for instance be made of silicone rubber, plastic, foam, or other flexible material capable of holding radiation-curable liquid during the manufacturing process. Different wall parts may be made of different materials or combinations of materials. In some embodiments, the walls may be supported by a frame. An advantage of this design is that the walls and floor may be made as a single part.

In the present embodiment, the two walls 501 are flexible and may therefore be deformed. The two walls 502 are rigid in the present embodiment, but may also be flexible or at least partly flexible. Having two rigid walls will improve the overall stability of the container. The floor is made of a flexible material (e.g. Gorilla glass) that can be flexed many times without breaking and may comprise a non-stick surface such as an FEP foil that is either loosely attached to—or fixedly laminated onto—the flexible material. Inclusion of a non-stick foil will further reduce the force that is required to detach products from the flexible floor as the adhesive forces are reduced. A build platform 520 is shown in order to illustrate where the build platform connects with the radiation-curable liquid in the presently described embodiment.

In the present embodiment, a frame 522 made of steel holds the container. In the present embodiment, the frame 522 also holds an elastic element 509, such as an elastic foam, that can support the interior floor of the container, or at least part of it, in a planar configuration. In the present embodiment, the elastic foam will maintain the planar configuration when no force is applied to it other than the weight of the container and the radiation-curable liquid in the container. The elastic foam supports the container around the edges and thereby allow hardening radiation from the radiation source to still reach the radiation-curable liquid.

In the present embodiment, the floor 507 of the container extends beyond the container walls 501,502 in an exterior part 505. A force applied to the exterior part will cause the interior floor to bend. An applied localised force will cause a more or less directly translated localized bending or displacement of the interior floor in a direction that is perpendicular and away from the build plane surface (see e.g. the following figs.), which allows for precise control of the shape and/or depth of the bending of the interior floor.

In the present embodiment, two "deformers" can be moved back and forth as indicated by the dashed arrows. When the deformers are moved over the exterior part 505, they press down on the exterior part and produce a bend in at least part of the floor. As the deformers are moved across the exterior part, from one end of the container to the other, the bend moves as well. A mechanism for displacing the deformers back and forth is not shown, but can easily be provided by the person skilled in the art.

A preferred bend shape comprises at least a first curvature with a radius of less than 500 mm, preferably less than 50 mm, and more preferably less than 5 mm. Said curvature is configured to produce a displacement of the flexible floor in a direction that is away from, and, e.g. substantially, perpendicular to, the build plane surface and has a depth of at least 0.1 mm, preferably at least 0.5 mm, and more preferably at least 1 mm. The deformation system is furthermore configured to move the bend along the flexible floor with a speed of at least 5 mm per second, preferably at least 20 mm per second, and more preferably at least 40 mm per second.

Figure 2B:
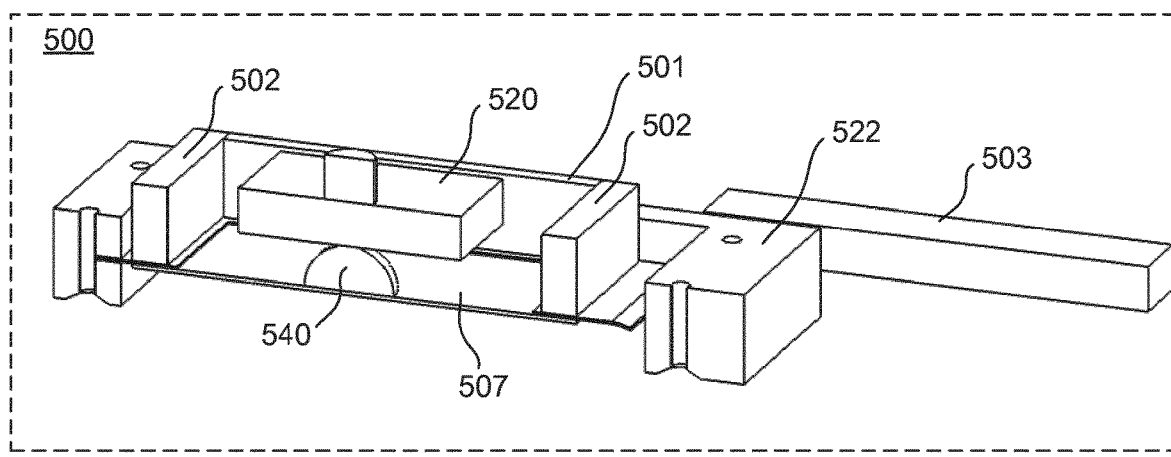

FIG. 2b illustrates a cross-sectional view of the part 500 in FIG. 2a. A product part 540 of a product has already been formed in the present illustration. The container comprises a build platform 520 that can be moved relative to radiation-curable liquid in the container to increase a distance between a build surface (not shown, but see FIG. 1) of the build platform and the floor 507 of the container. A surface of radiation-curable liquid is not shown in FIGS. 2a to 8, but the person skilled in the art will readily realize where such a surface may be located.

Figure 3:
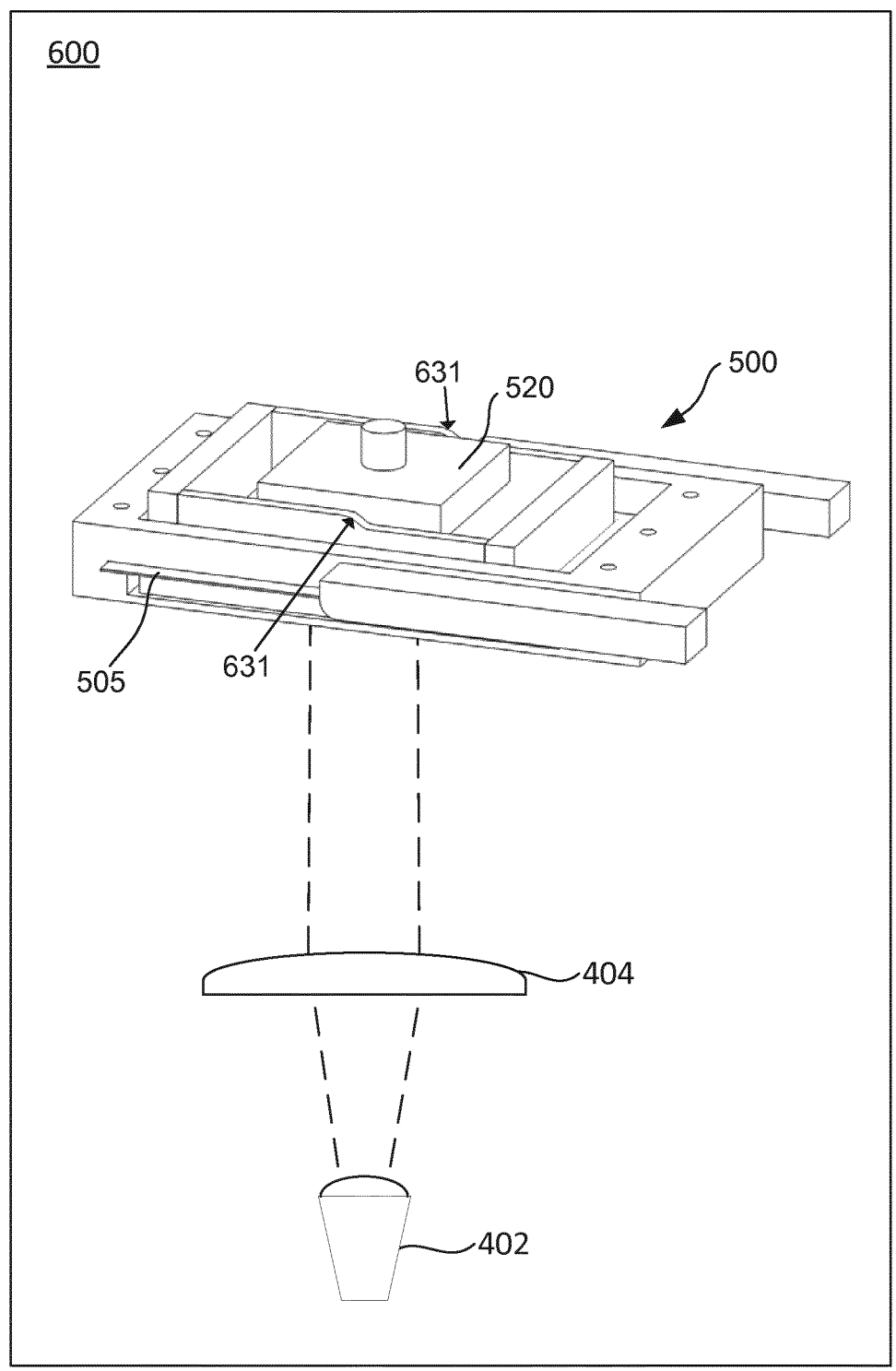
FIG. 3 illustrates an additive manufacturing apparatus in accordance with an embodiment of the invention.

FIG. 3 illustrates schematically an additive manufacturing apparatus that uses the part 500 of FIGS. 2a and 2b. Actuator means for moving the build platform and a mechanism for displacing the deformers are not shown. Radiation from the radiation source solidifies radiation-curable liquid in a desired pattern as generally known. A lens system 404 focuses the light onto the liquid. When a layer has been solidified, the deformers are moved across the exterior part (see FIGS. 2a and 2b) in order to controllably and reproducibly release the layer from the bottom of the container. The deformers create a bend in the container floor. The bend "moves" across the container floor (or a part of the container floor) from one end to the other to gradually peel away the floor from the product being or having been manufactured. Thus, as the bend moves across the container floor, a gradual, controlled, and reproducible release of the one or more products is obtained. This is beneficial compared to a random, tension—or compression-induced 'displacement' of the position and/or state of more or less the entire floor, which is quite unpredictable as it depends (among other things) on the size, shape and elasticity of the floor, as well as the size, shape and distribution of products across the floor. Furthermore, the gradual release enables a highly controllable release of the product. A gradual (and controllable) release is also an advantage in relation to separating a plurality of separate products located on a single container floor. The bend may also be moved back and forth locally e.g. to carefully and gradually releasing a product.

Following completed release, the build platform may be raised to allow new liquid to flow into the area under the build platform. During subsequent lowering of the build platform to a desired distance above the floor, compression of the liquid occurs. To ensure a uniform thickness of the layer of liquid that is trapped between the platform and the floor, it is significant that the floor is capable of maintaining—or rapidly returning to—an essentially planar configuration. For some applications, 'essentially planar' means that a distance between any given point of the floor and the surface of the build platform must deviate less than 0.1 mm, preferably less than 0.05 mm, preferably less than 0.01 mm, and even more preferably less than 0.001 mm from a fully planar configuration when hardening radiation is applied to the liquid that is trapped between the platform and the floor. For some applications, 'rapidly' means that the floor is returning to an essentially planar configuration in less than 5 seconds, preferably less than 2 seconds, and even more preferably less than 1 second after lowering of the build platform to the desired position above the floor.

A particular point in the process is shown in FIG. 3. Arrows 631 in FIG. 3 illustrate a bend that is created by the deformer exerting a force on the exterior part 505. As disclosed above, the shape and depth of this bend may be controlled by design, and the speed of travel of the deformers that controls the speed of travel of the bend may likewise be controlled. Thus, the application of peel-off force to each product that is the result of the shape, depth and travel-speed of the bend may be an entirely uniform, reproducible, and controllable process that may be repeated indeterminably and independently of the size, shape, and number of components that are distributed across the flexible floor (as opposed to random buckling happening in response to the compression of a flexible container). The release process is described in more detail in the following.

Figure 4A:
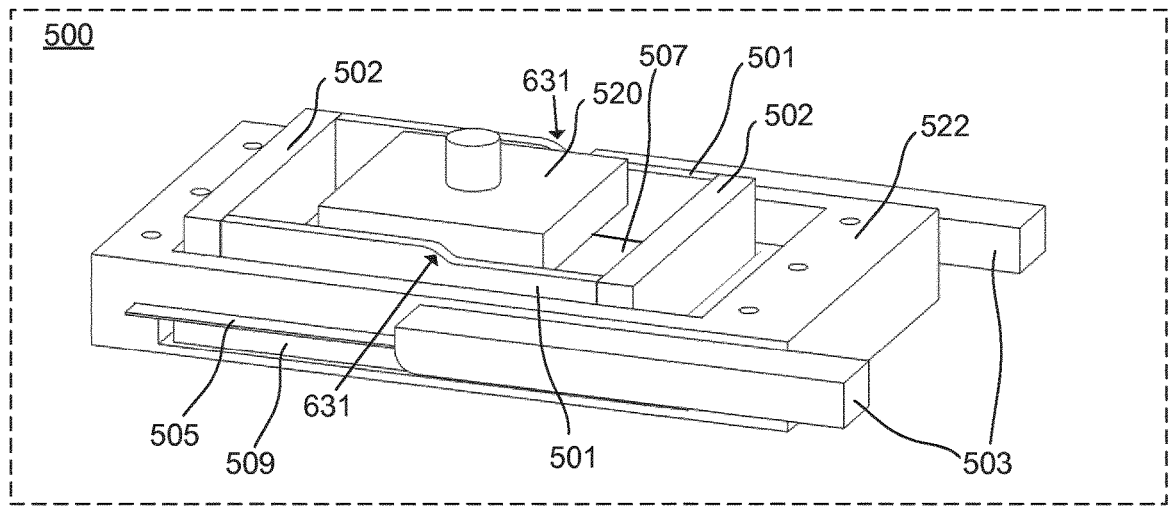
FIGS. 4a and 4b illustrate a container part of an additive manufacturing apparatus in accordance with an embodiment of the invention, wherein the floor of the container is in a bent configuration.

Whereas FIGS. 2a and 2b illustrated the floor 507 in a planar (non-flexed) configuration, FIG. 4a illustrates the part 500 at a point at which the deformers 503 have reached (approximately) the middle of the vat. Bends 631 are created in the flexible walls and flexible floor as a consequence of the force applied by the deformers as described above. While the floor is being pressed down by the deformers 503, the elastic element 509 presses back. When the deformers are moved away, the elastic element returns to the shape in which the floor is maintained in its planar configuration.

Figure 4B:
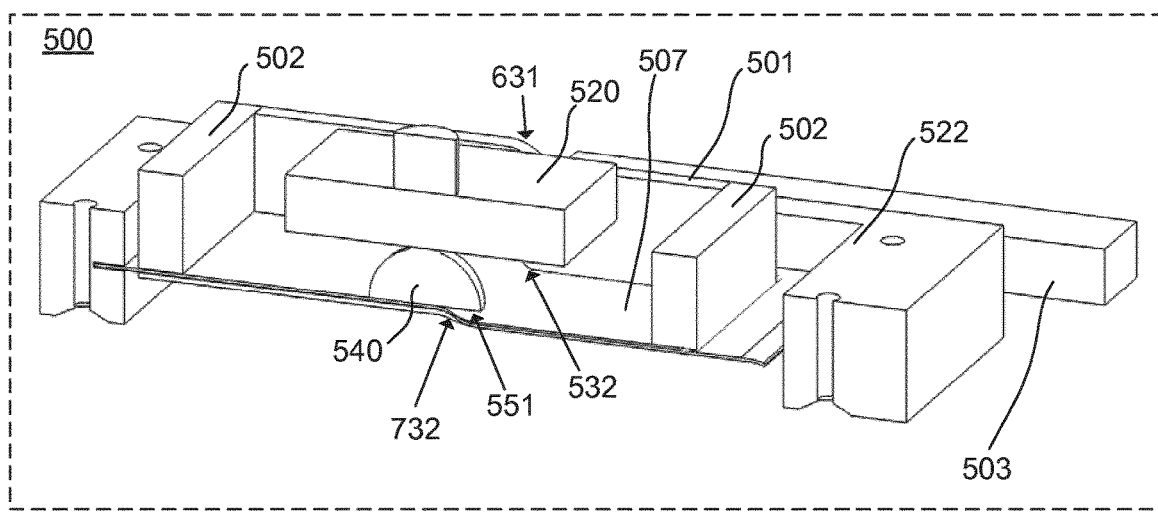

FIG. 4b illustrates a cross-sectional view of the part 500 at the point shown in FIG. 4a. The bend shown by arrows 631 is echoed at the floor of the vat, as shown by arrows 732. At this point, the bend has reached the newly formed layer of the product 540. The moving bend has allowed the floor 507 to carefully "peel away" from a corresponding part of the newly formed layer. Because the bend moves gradually and encounters each product distributed across the floor in a gradual, uniform and, entirely controlled manner, the adhesive forces and/or negative pressure that is present in the interface between each product and the flexible floor, are gradually and progressively released. The fact that the shape and depth of the bend, as well as the travel speed of the bend, may be entirely controlled by design means that the force applied to each layer during the peel-off may also be controlled to be essentially the same. Such gradual, progressing, and controlled release of adhesive forces and/or negative pressure that is enabled according to aspects of this invention ensures that each layer that is formed is released in essentially the same manner. This is very different from a random, tension- or compression-induced release of adhesion and/or negative pressure that is induced by prior art, which is quite unpredictable as it depends (among other things) on the size, shape and elasticity of the floor, as well as the size, shape and distribution of products across the floor.

Figure 5A:
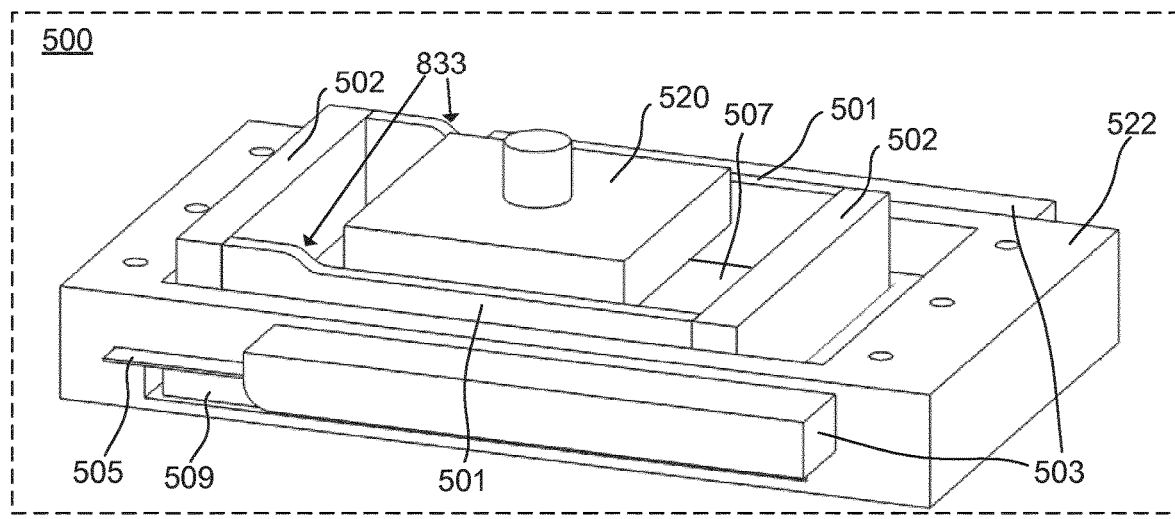
FIGS. 5a and 5b illustrate a container part of an additive manufacturing apparatus in accordance with an embodiment of the invention, wherein the floor of the container is in a bent configuration.

FIG. 5a illustrates a later position of the deformers 503 during the release process. The bend is now situated even further towards the other end of the container, opposite the end where the bend was initiated. Arrows 833 illustrate the bend on the upper edge of the container.

Figure 5B:
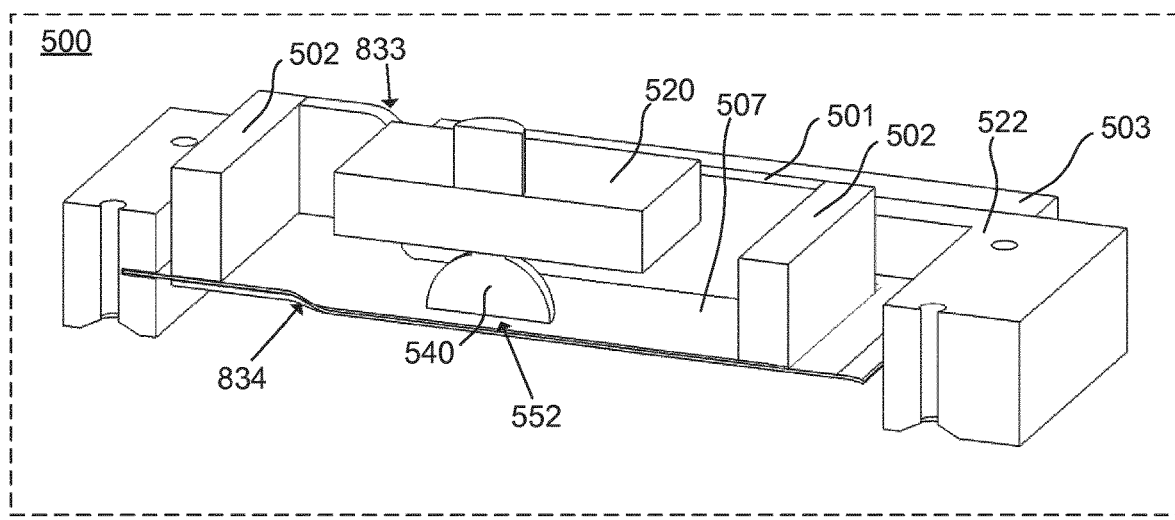

The cross-sectional view corresponding to FIG. 5a is shown in FIG. 5b. It illustrates the corresponding bend in the floor of the container, indicated by arrows 834, which echoes the bend shown by arrows 833. The deformers press down along the edge 505 all the way from the starting point until the end of the deformer. That the deformers press down along the edge 505 all the way from the starting point (or from the starting point in that direction of the deformer) until the end of the deformer keeps the floor (along the extent of the deformer), i.e. the parts of the floor that already has been bent away from the product, away from the product prevents the product from 'sticking' back onto the floor until the build platform can be elevated and new liquid can flow into the area between the platform and the floor.

Note that a film of radiation-curable liquid now covers the already released part of the manufactured part 540. Accordingly, the deformer system may alternatively in some cases apply a pressure only locally without compromising the release process. Such an embodiment is shown in FIG. 8, which is described further elsewhere in this specification.

The build platform, which holds the manufactured part 540 in the same position during the release process illustrated in this example, ensures that the floor is maintained at a distance from the manufactured product 540. At this point, the product 540 is fully released from the floor of the container (and has been since the bend had passed the entire lowest layer of the product 540), as illustrated by arrow 552. In some embodiments, the platform can be raised gradually as the bend moves across the container floor. However, such embodiments may partly compromise the advantage provided by preferred embodiments of the invention, namely to provide as controlled and gradual a release as possible.

With the manufactured part now released, the build platform can be raised at least a distance corresponding to the thickness of the next layer. The deformers can then be returned to their initial position to allow the floor to assume its planar configuration and original distance to the build platform. The apparatus is ready for solidifying a new layer of the product. The planar configuration results because the elastic element is no longer under pressure resulting from the deformers pressing down the floor. Note that the planar configuration needs only be assumed at the floor part where the product will be manufactured. Accordingly, when the deformers are in their initial position, ready for performing the release, they may still be applying force to a part of the container floor (provided in this illustration via the exterior part 505).

With embodiments of the present invention, the product is subjected to a relatively small, gradual, localised, and highly controllable force and thereby gradual, localised, and highly controllable release from the container floor. The result is an increase in yield.

FIGS. 6-8 illustrate other ways of providing a bend for releasing a product from the floor of the container.

FIG. 6 illustrates a slidable element 903 having a groove 960. It engages the exterior part 505 at a first end 962. A bend in the groove forces the exterior part 505 to bend as indicated by arrow 933 and 934 when the deformer is moved along the container. An S-shaped groove is illustrated. Embodiments may use alternative shapes and yet achieve the same result. In some cases, an S-shape similar to those shown in the illustrations may be advantageous and provide the least possible stress to the manufactured part 540 during the release.

FIG. 7 illustrates providing a bend by using a set of rollers 1071, 1072, 1073. The configuration forces the exterior edge to bend as shown by arrows 1033 and 1034.

FIG. 8 illustrates how a single roller 1171 may be used for providing the bend. As the roller 1171 is moved along the container, it pushes the exterior edge down, creating the bend indicated by arrows 1133 and 1134.

The term "bend" shall be interpreted broadly. A bend in the context of the present invention is a deformation that is capable of providing the effect of gradually peeling away the container floor from the manufactured product. An S-like shape has been illustrated. The bend could instead have the shape of an arc or resemble an arc. FIG. 8 illustrates another possible shape. These examples provide a non-exhaustive list, as the person skilled in the art will readily recognize.

Embodiments of the present invention rely on motion of a bend or deformation in the flexible floor of a container to actively peel off a manufactured part that adheres to the container floor. This moving bend or deformation can be obtained by moving the container or by moving a deformer or by moving both. A number of examples of deformation systems have been illustrated. The deformation system may assume other shapes or be based on other principles suitable in a given situation, and as discussed above, many bend shapes can be used to provide the required effect.

The invention claimed is:

1. An additive manufacturing apparatus comprising:
   a container for holding a radiation-curable liquid;
   a build platform having a build surface for holding a product being manufactured during a manufacturing process, the build platform being movable relative to the container in a predetermined direction; and
   a radiation source for providing hardening radiation to selectively solidify radiation-curable liquid in the container by exposure to form the product,
   wherein:
      the container comprises an interior floor having a flexible floor part maintainable in a planar configuration in which the flexible floor part is planar;
      radiation-curable liquid in contact with the interior floor is confined by a container wall comprising at least one flexible wall section arranged to move intactly with the flexible floor part; and
      the manufacturing apparatus comprises a deformation system configured to cause a displacement of at least a part of the flexible floor part in a direction having a component normal to and pointing away from the build surface of the build platform thereby releasing at least a part of the product at the displaced part of the flexible floor part, wherein the deformation system is further configured to cause a gradual displacement consisting of a localized bend that spans a width of the flexible floor part and is caused to travel along the length of said floor by the deformation system.

2. An additive manufacturing apparatus in accordance with claim 1, wherein the deformation system is configured to cause a gradual displacement of at least a part of the flexible floor part.

3. An additive manufacturing apparatus in accordance with claim 1, wherein the deformation system is configured to cause a gradual increasing displacement of at least a part of the flexible floor part.

4. An additive manufacturing apparatus in accordance with claim 1, wherein the gradual displacement consists of creating a bend with a given shape and depth that spans the width of the flexible floor part and is caused to travel along the length of said flexible floor at a given speed by the deformation system.

5. An additive manufacturing apparatus in accordance with claim 1, wherein the deformation system is configured to maintain and gradually increase the displacement of at least a part of the flexible floor part at least until release of the product.

6. An additive manufacturing apparatus in accordance with claim 1, further comprising, as part of the deformation system, one or more flexible exterior parts positioned on an outside of the container and configured to receive a predetermined bending force and to communicate at least a part of the predetermined bending force to the flexible floor part to effect the displacement.

7. An additive manufacturing apparatus in accordance with claim 6, wherein the exterior part or parts are an extension of the container floor beyond at least a part of the container wall.

8. An additive manufacturing apparatus in accordance with claim 6, wherein the deformation system is configured to cause said displacing by applying a bending force on the exterior part or parts.

9. An additive manufacturing apparatus in accordance with claim 6, wherein the deformation system comprises one or more movable rollers arranged to engage the exterior part to produce said bending force.

10. An additive manufacturing apparatus in accordance with claim 6, wherein the deformation system comprises a movable element having a curved groove configured to engage an edge of the exterior part and to move along at least a part of said edge.

11. An additive manufacturing apparatus in accordance with claim 6, wherein the deformation system comprises a reconfigurable element configurable to apply a predetermined force on the exterior part to produce the bend during a bending period.

12. An additive manufacturing apparatus in accordance with claim 11, wherein the predetermined force produces a bend in the flexible floor part, and said bend travels across the flexible floor part during the bending period, a shape of the bend optionally changing during the travel.

13. An additive manufacturing apparatus in accordance with claim 1, wherein the flexible floor is configured to rapidly re-establish a planar configuration and parallel orientation to the build surface.

14. An additive manufacturing apparatus in accordance with claim 1, wherein the flexible floor part is supported by an elastic element arranged to maintain the flexible floor part in the planar configuration during a period of time.

15. An additive manufacturing apparatus in accordance with claim 1, wherein in the planar configuration of the flexible floor part is substantially parallel to the build surface.

16. An additive manufacturing apparatus in accordance with claim 1, wherein the additive manufacturing apparatus is adapted to re-establishes the planar configuration that is parallel to the build surface and forces away excess liquid after moving the build surface to a first lowered position.

17. An additive manufacturing apparatus in accordance with claim 1, wherein the interior floor of the container extends beyond the container wall into an exterior part, and wherein the deformation system is configured to cause the gradual displacement consisting of the localized bend by applying a force to the exterior part.

* * * * *